UNITED STATES PATENT OFFICE.

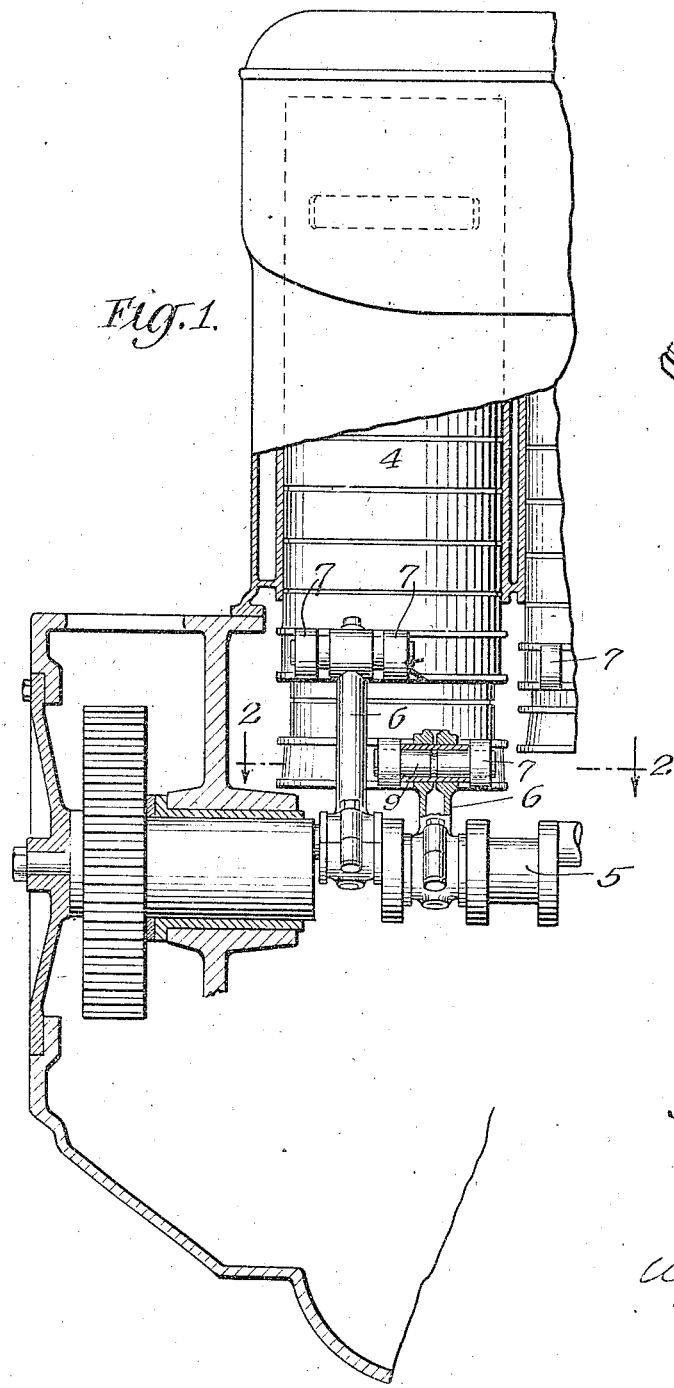
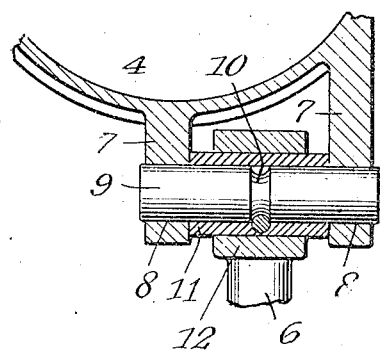
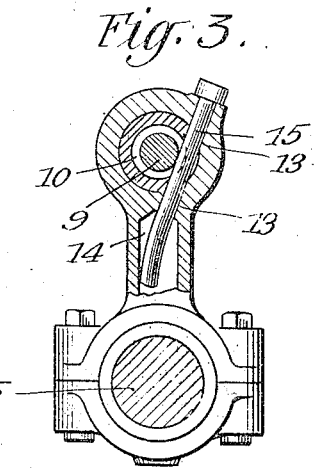

ALFRED L. CAMPBELL, OF ELMHURST, NEW YORK, ASSIGNOR TO BREWSTER & CO., A CORPORATION OF NEW YORK.

WRIST-PIN CONNECTION.

1,209,393.  Specification of Letters Patent.  Patented Dec. 19, 1916.

Application filed August 22, 1916. Serial No. 116,302.

*To all whom it may concern:*

Be it known that I, ALFRED L. CAMPBELL, a citizen of the United States, residing at Elmhurst, Long Island, county of Queens, and State of New York, have invented a new and useful Improvement in Wrist-Pin Connections, of which the following is a specification.

My invention relates especially to means for connecting the valve-operating pitmen of a Knight sleeve valve engine to the sleeve valves, but is applicable as well to many other similar mechanical situations.

The object of my invention is to provide a compact, secure and convenient connecting means for this purpose, and to this end my invention, in its present embodiment, comprises several features, including bearing lugs in which the wrist pin is mounted to rock, a peripherally grooved wrist pin, a sleeve through which the wrist pin is passed, interposed between the wrist pin bearings, a pitman having a hub through which the sleeve is passed, a doubly bent pin-way extending transversely through the sleeve, the wrist pin groove and the pitman, and a locking pin which is forced through the wrist pin groove and through the two bends in the pin-way so as to lock the wrist pin securely in position with respect to the sleeve and pitman hub, and by its double deflection remain itself securely locked in place.

In order that my invention may be fully understood, I shall first describe in detail the mode in which I at present prefer to carry my invention into practice and then define the spirit and scope of the invention in the claims.

Reference is to be had to the accompanying drawings forming part of this specification in which like parts are designated by the same numerals in all the figures.

Figure 1 is a sectional side elevation showing one embodiment of my invention applied to the wrist pin connection of a Knight sleeve valve engine. Fig. 2 is an enlarged sectional plan view of the said wrist pin connection on the line 2—2, Fig. 1. Fig. 3 is a still further enlarged cross-sectional elevation of the same.

In the drawings, 4 designates the reciprocating sleeve valves of an ordinary Knight sleeve valve engine, 5 designates the valve operating crank shaft, and 6 the connecting rods or pitmen by which the sleeves 4 are reciprocated by the crank shaft 5.

To connect each pitman 6 with the sleeve 4, I fix, by preference, integrally on the outside of the sleeve a pair of lugs 7, having bearings 8 for a wrist pin 9, which latter is formed medially with a peripheral locking groove 10. The wrist pin 9 is passed through the lug bearings 8, and through a close-fitting sleeve 11, fitted between the lug bearings 8, the sleeve 11 having been previously passed through the close-fitting hub 12 formed on the upper end of the pitman 6. Through the hub 12 and sleeve 11 is formed a transversely diagonal pin-way 13, leading through the wrist pin groove 10, and the pin-way 13 leads downward into a pin cavity 14 formed by the interior of the hollow shank of the pitman 6, the wall of said cavity being bent or at an oblique angle with respect to the axis of the pin-way 13. A headed wrist pin locking-pin 15, preferably of spring metal, is then fitted and forcibly driven into the pin-way 13, where its end is first deflected laterally by and through the wrist pin groove 10, then bent back into the lower part of the pin-way 13, and then deflected laterally again by the relatively bent or inclined wall of the pitman cavity 14. The locking pin 15 thus securely locks the wrist pin 9 in position in its rock bearings 8, and to the sleeve 11, and the hub 12 of the pitman 6, and at the same time is securely locked in its pin-way by its double deflection produced by the out-of-line wrist pin groove 10, and the angular wall of the cavity 14.

It is evident that my invention may take various other forms according to the situation to which it is applied, and its embodiment may be otherwise greatly varied without departing from the boundaries of my invention, for a definition of which reference is to be had to the following claims.

I claim as my invention:

1. The combination, with a wrist pin and a pitman having a cross pin-way leading by the wrist pin and bent beyond said wrist pin, of a locking pin forced by said wrist pin in said pin-way and doubly deflected by the wrist pin and the bend in the pin-way.

2. The combination, with a wrist pin having a peripheral groove and a pitman having a cross pin-way leading through said groove and bent beyond said groove, of a locking pin driven through said cross pin-way and peripheral groove and bent beyond the groove by the bend in the pin-way.

3. The combination, with a wrist pin and wrist pin bearings, a sleeve on the wrist pin between the bearings, and a pitman having a hub surrounding the sleeve, and a cross pin-way extending through the hub and the sleeve by the wrist pin and bent beyond the wrist pin, of a locking pin driven into the pin-way by the wrist pin and bent by the bend in the pin-way.

ALFRED L. CAMPBELL.